United States Patent [19]

Blumle

[11] 4,310,963
[45] Jan. 19, 1982

[54] METHOD FOR THE FABRICATION OF AN APPARATUS FOR THE CLOSE FITTING POSITIONING OF WORKPIECES TO BE MACHINED

[76] Inventor: Rudi Blumle, Schwarzbachstr. 52, 7000 Stuttgart, Fed. Rep. of Germany

[21] Appl. No.: 142,975

[22] Filed: Apr. 23, 1980

Related U.S. Application Data

[63] Continuation of Ser. No. 869,525, Jan. 16, 1978, abandoned.

[51] Int. Cl.³ .............................................. B23Q 3/18
[52] U.S. Cl. ..................................... 29/460; 29/464; 29/530; 156/305; 269/900
[58] Field of Search ................. 269/53, 54, 54.4, 54.5, 269/292, 309, 311, 321 A, 900; 29/460, 530, 464-468; 156/305

[56] References Cited

U.S. PATENT DOCUMENTS 3,638,934 2/1972 Blum et al. ........................ 269/311

Primary Examiner—Robert C. Watson
Attorney, Agent, or Firm—Gifford, Van Ophem, Sheridan & Sprinkle

[57] ABSTRACT

An apparatus for the close fitting and high precision positioning of workpieces to be machined, or constructed particularly for reducing deformations of a workpiece under influence of machine tools, drilling machines, milling machines, grinders, planars, snapers, as well as a method of fabricating the apparatus.

3 Claims, 12 Drawing Figures

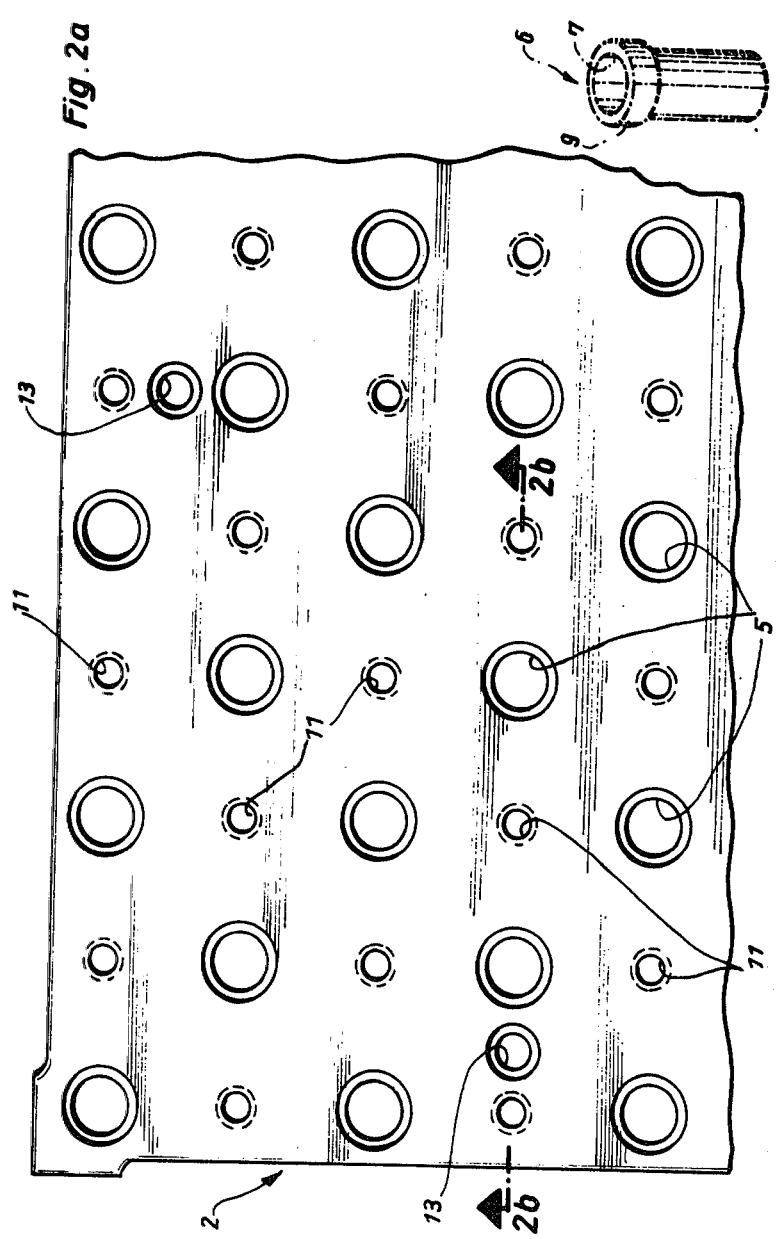

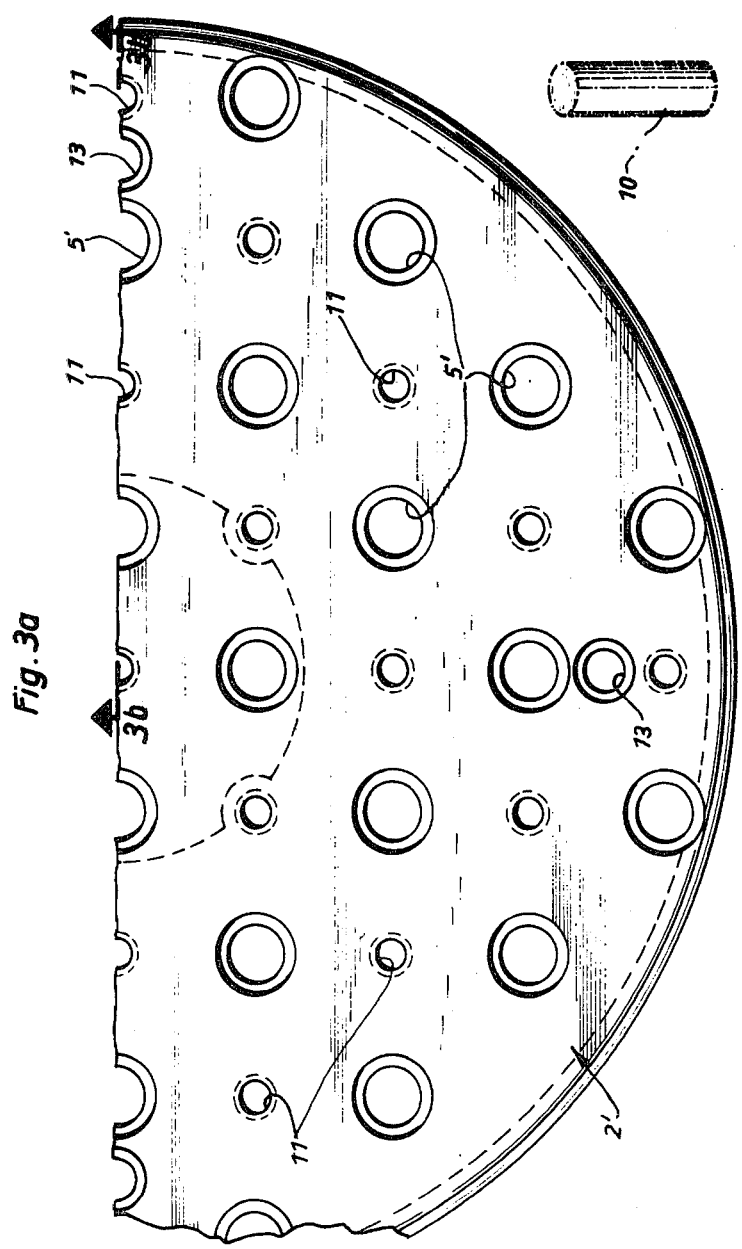

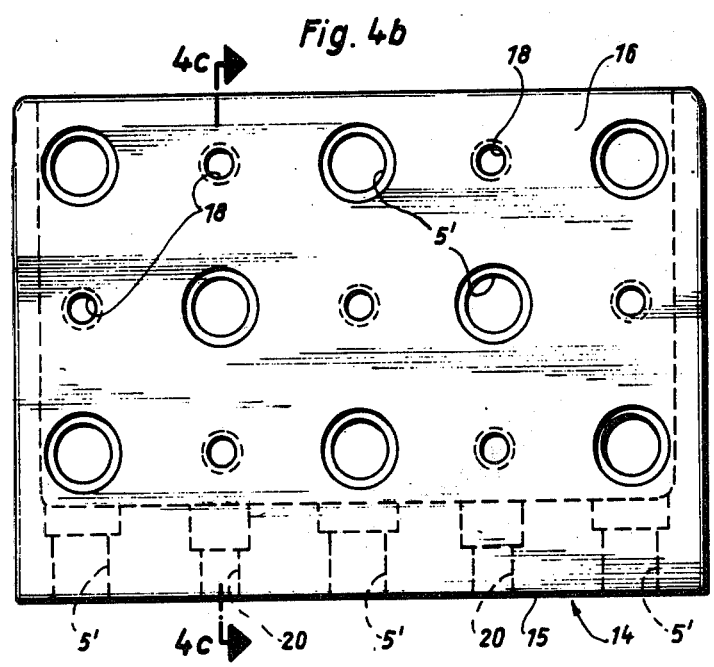
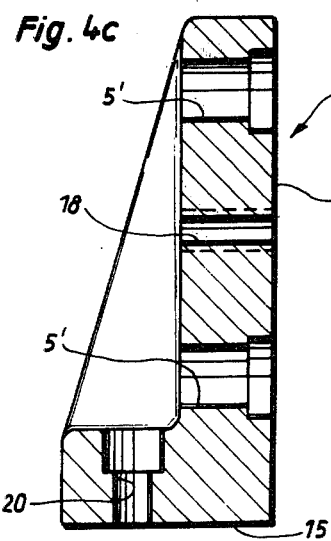
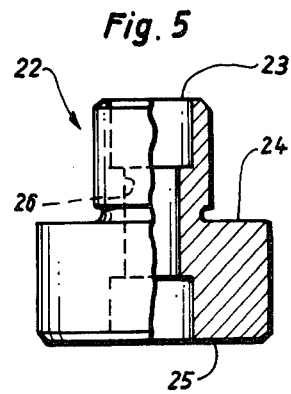

METHOD FOR THE FABRICATION OF AN APPARATUS FOR THE CLOSE FITTING POSITIONING OF WORKPIECES TO BE MACHINED

CROSS REFERENCE TO RELATED APPLICATIONS

This is a continuation of application Ser. No. 869,525, filed Jan. 16, 1978 now abandoned.

BACKGROUND OF THE INVENTION

It is very often necessary in tool construction, for instance, in the machining of the workpieces, in fabrication of the basic appliances and in general in the fabrication of new structural elements and workpieces, to be able to align and to fasten the workpieces in a highly precise manner and relationship to each other and to a tooling machine.

In such cases, it is either possible to use the most expensive appliances, which have to be built with high precision for that particular purpose and which therefore considerably increase the prototype's cost, or to use makeshift clamping techniques, which frequently result in undesirable inaccuracies which prevent the prescribed measure of precision.

SUMMARY OF THE PRESENT INVENTION

The present invention overcomes the above mentioned disadvantages by providing an apparatus for clamping of the workpieces and for assembling of the basic devices in tool construction. Due to its versatility, it has multiple functions and can be repeatedly reused, its clamping points situated with the highest precision and accuracy, and it is reasonably inexpensive and can be easily fabricated.

The invention comprises a modulated clamping system wherein precision holding sockets are disposed in holes drilled out with normal degree of accuracy, and held by means of an age hardening material, and are positioned in a highly accurate modulated network or design with prescribed distance measures, and further comprising threaded bore holes disposed within the modulated network design for the fastening of holding and/or stopping devices, (holding angles, stopping rails or reglets, bearing rails, bearing turrets and the like).

After a plate is fabricated with an accurately modulated clamping system, provided with corresponding holding or bearing devices, it can be used repeatedly, and, because of its considerable adaptability it offers the possibility of bearing and fastening the workpieces to be machined with the highest precision (tolerance of ±0.01 mm), previously attainable only with use of the most expensive apparatus.

Such a clamping plate with a modulated clamping system can be fabricated in accordance with a preferentially chosen procedure, as for instance:

(a) By drilling in a plate with normal accuracy (for example of ±0.3 mm) a number of holes at modulated distances.
(b) By placing in the bore holes the precision holding sockets of a smaller size than the drill hole diameter, thus leaving a certain interspace.
(c) By fixing the distances between the placed preision holding sockets by means of a highly accurate master plate.
(d) By introducing in the interspace between the holding sockets and the bore holes an age hardening material, and by separating the holding plate from the master plate after the hardening of the material.

According to a further development of the invention, in the initially described system, the fitting bore part and the threaded bore part are disposed in a receiving bore hole in such a way that any eccentricity is avoided and, moreover, so that all bore holes maintain a highly accurate distance relationship.

The invention's development has solved this subsidiary task on the initially mentioned modulated holding system by arranging the first precision fitting holding socket in the fitting bore part to correspond with a second precision holding threaded socket in the concentrically threaded bore part, both held in place by means of the introduction of the hardening material in the ring-shaped interspace between the socket and the bore hole; the final position of the threaded socket is determined before the hardening of the corresponding grouting material around the threaded socket by the position of the conjugated fitting socket.

In this further development there is therefore a separate holding socket for the fitting bore hole part, and a holding socket provided with an inner thread for the threaded hole's part; the fitting socket and the threaded socket can be prepared in two separate work processes, so that the work can be done with high precision and so that the sockets can be made with a corresponding degree of hardness. Thereafter, both sockets are placed in the oversized receiving bore hole on the plate. At that occasion, in the most general case, each socket is given a predetermined position, for instance by means of a master plate. According to this position, the final position of the second socket is determined in such a manner, that one obtains an absolutely concentrical positioning of the two sockets in a highly accurate system of coordinates on the modulated clamping plate.

It is expedient to operate in such a manner that, first of all, the fitting holding sockets are placed in the corresponding receiving holes of the modulated clamping plate, and held in place by means of sizing pins, or a precision master plate. Then the sockets are positioned by means of the introduced two components grouting mass. After the fitting sockets have been fastened in this manner in the predetermined modulated system positions, the sockets receive the fitting screws. The threaded part of the fitting screws, for instance, on the other side of the modulated plate, are then screwed into the threaded holding sockets. Thereby each threaded holding socket receives automatically a highly accurate alignment with respect to the fitting holes part; finally and in the same manner follows the fastening of the holding threaded sockets by means of the introduction of an appropriate age-hardening material in the ring-shaped space between the outer walls of the socket and the inner wall of the receiving bore hole. In this way one obtains a highly accurate, full value modulated clamping plate, which is almost indestructible, since the holding sockets used for the fitting and the threaded part are adequately hardened; this clamping plate needs only a relatively small number of receiving bore holes, since each fitting bore simultaneously, as due to the presence of an inner threading, can serve as a fastening bore for the received parts.

Further developments of the invention will be explained subsequently.

DESCRIPTION OF THE DRAWINGS

The positioning apparatus of the present invention will be more clearly understood by reference to the following detailed description when read in conjunction with the following drawings, in which:

FIG. 2a is a top plan view of a partial section of a rectangular modulated clamping plate as a basic element of the clamping apparatus of the present invention;

FIG. 3a is a top plan view of a circular modification of the modulated clamping plate of FIG. 2;

FIG. 3b is a fragmentary elevation of the cross section of the plate in FIG. 3a taken substantially along the line 3b—3b of FIG. 3a.

FIG. 4b is a side view of the clamping angle of FIG. 4a;

FIG. 4c is a cross section of the clamping angle taken substantially along the line 4c—4c of the FIG. 4b;

FIG. 5 is a fragmentary side view of an example of a bearing or a distance piece with highly accurate finished surfaces, turret shaped;

FIG. 6b is a cross section of the reglet in FIG. 6b taken substantially along the line 6b—6b of the FIG. 6a.

DESCRIPTION OF A PREFERRED EMBODIMENT

Figure 1:
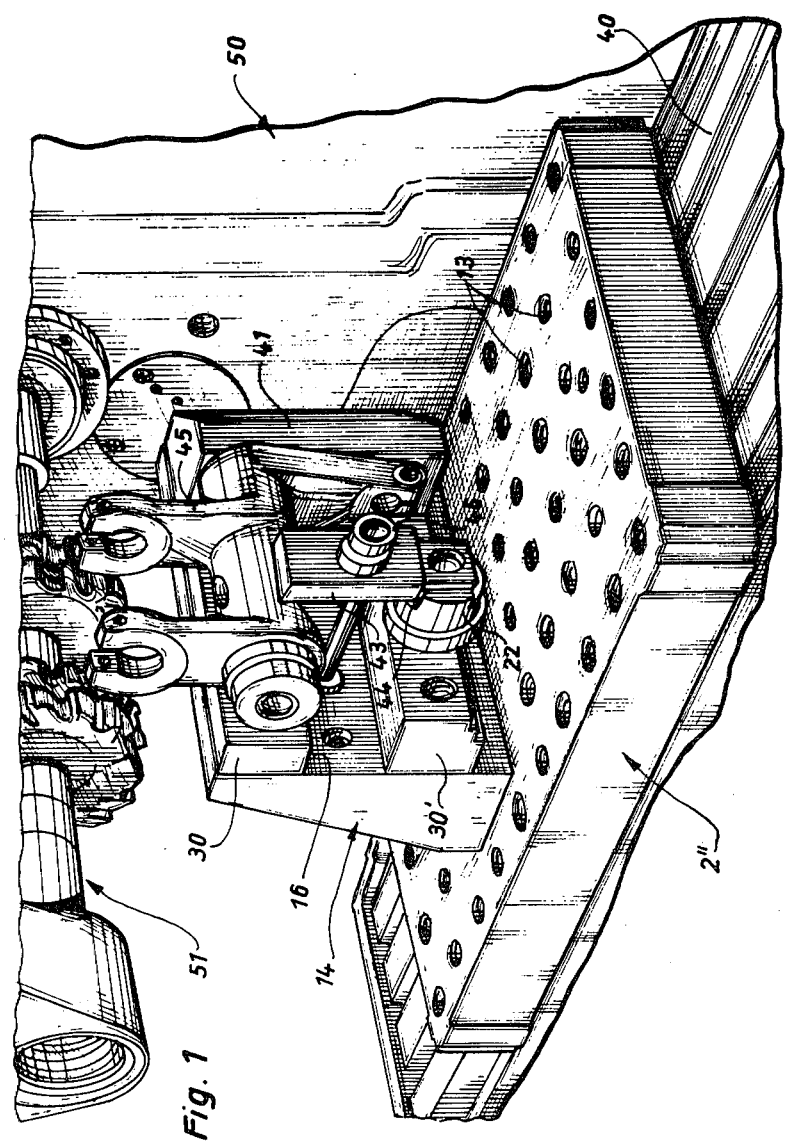
FIG. 1 is a perspective view of an apparatus in conformity with the invention, together with a workpiece clamped thereto to be machined by a milling machine.

The modulated clamping system for the tool construction, or for the bearing of the workpieces in conformity with the invention, includes in the simplest case the modulated clamping plate as in the FIGS. 2a and 3a, with addition then of any subsidiary elements, to wit: clamping angles, bearing turrets, precision fastening pins, bolts and the like.

The universal application possibilities of a similar modulated clamping system are based on the fact that the modulated clamping plates as in the FIGS. 2a and 3a, given only as examples, show the bore holes only in a precisely determined spaced arrangement; these bore holes are provided at a precise modulated distance measured from each other over the entire surface of the clamping plate, preferably within a precision degree of ±0.01 mm. The depressions or bore holes, the making and execution of which will be discussed in a more detailed manner subsequently, are disposed in the flat dimension of the clamping plate at the predetermined modulated network distances. In the case illustrated in FIG. 2a, the distances between separate depressions or bore holes can, for example, be equal to 60 mm from each other in two principal directions.

Because of the prescribed accuracy degree of ±0.01 mm for the distances of bore holes or depressions from each other, it can be understood that the accurate fabrication of a new clamping plate by conventional methods would cause such great expenditure, that a similar system could never be realized within an acceptable budget, nor within acceptable expenses. On the other hand, the invented manner of arranging the highly accurate depressions or bore holes in a modulated network design for positioning of basic devices and bearing of workpieces to be machined, is extremely efficient and helpful in providing accurate fabrication and machining of the workpieces.

The invention provides that for the fabrication of such modulated clamping plates, one needs to prepare with the highest accuracy only one high precision master plate in order to realize the desired modulated system with the predetermined distance measures.

The fabrication of such a plate, which will not be discussed in detail here, takes place for instance in air-conditioned rooms and with use of the high precision tools. Such a precision master plate can contain the precision bore holes at the desired network distances; it can also contain the circular section pins of a predetermined diameter and placed according to such network distances.

It so happens that the fabrication of such a precision master plate involves a substantial expenditure, but on the other hand, the invention permits, by starting from this master plate, the preparation of an unlimited number of modulated clamping plates (each with the same modulus) in the form of a versatile machining support construction collection, or a kind of a "building box", under more acceptable price conditions.

In order to fabricate the examples shown in FIGS. 2a, 2b, 3a and 3b, the receiving bore holes 5 are first drilled at the desired modulated distances; these "prebores" can tolerate a certain inaccuracy with respect to the modulated network; this means that the fabrication of the receiving bore holes takes place with a normal precision degree, involving only moderate expenses; for example, a tolerance of ±0.3 mm is permissible. It will be understood that such an inaccurately bored network cannot be sufficient to satisfy the precision requirements necessary in the tool construction for the accurate reproduction of supports for the machined workpieces, etc.

The invention allows for the use of precision sockets, preferably steel sockets; such a socket is shown at 6, in the perspective view of the FIG. 2a. These precision holding sockets 6 include an accurate inner bore hole 7 and have a cylindrical shape as in the chosen example and outer dimensions which are not subject to any precision requirements. The precision holding sockets are preferably made of hardened steel and are thus capable of withstanding frequent use without presenting wear problems. Precisely this is the important advantage of the present invention and it will be discussed more at length further on.

Figure 2B:
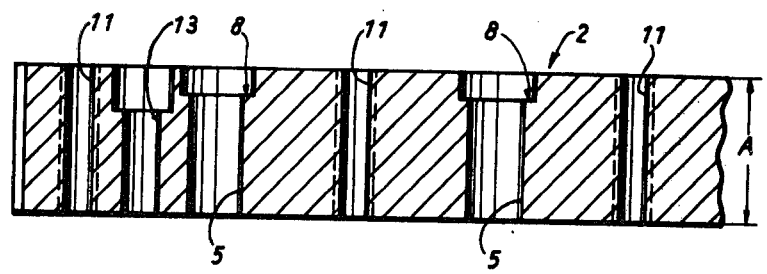
FIG. 2b is a fragmentary elevation of the cross section of the modulated plate taken substantially along the line 2b—2b of FIG. 2.
Figure 3B:
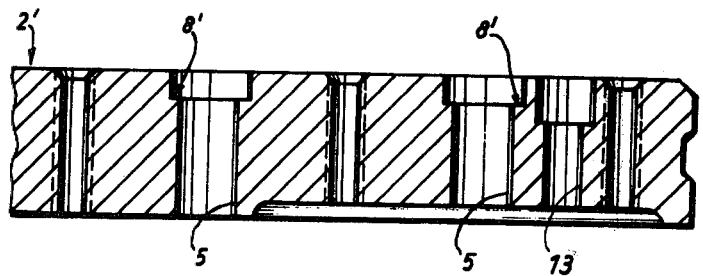

In the simplest case, in order to fabricate a modulated clamping plate 2 of the type shown in FIG. 2a or 2' or of the type shown in FIG. 3a, the work will be continued in such a way, that there will exist between the outer diameter of the precision holding socket 6 and the inaccurately bored receiving bore hole 5 in the modulated plate, a noticeable gap. In the examples in the FIGS. 2a, 2b, as well as in 3a and 3b, the receiving bore holes 5, (it can be noticed particularly on the sectional views of the FIGS. 2b and 3b), are shaped as countersunk. In such a case the corresponding precision holding sockets are provided with a shoulder 9, shown hatched in the holding socket 6 of the FIG. 2a.

In the simplest case, the receiving bore holes 5 can be shaped as continuously cylindrical, without heel, and the holding sockets 6 of hardened steel are then also cylindrical without any shoulder.

The further step is determined by the fact that it is necessary to stabilize the holding sockets 6, which in the shown example have been introduced in the receiving bore hole 5 and which are loosely located therein, thus providing a noticeable spacing, in their subsequent, as yet unattained, accurate positions with aid of the precision master plates. In other words, the precision master plate serves to give, through its corresponding high precision modulus measure, the exact positions of the precision holding sockets in the clamping plate 2 or 2′, which initially, and namely by means of the receiving bore holes 5 have been located inaccurately.

Precise alignment of the sockets can be attained by pins existing at accurate distances on the master plate with their outer diameter corresponding with extreme accuracy to the inner diameter of the holding sockets. Thereafter, the modulated plate 2, 2′ can, with its inaccurately bored network, be elevated over the master plate. As the plates are brought together, the pins on the master plate engage the accurate inner bores of the sockets and thereby accurately position the sockets within the receiving bore holes 5. The ring-shaped space appearing between the receiving bore holes 5 and the outer perimeter of the holding socket 6 which is noticeable and could for example be comprised between 1 and 3 mm, is then filled out with a precision holding matter, preferably by an age hardening artificial matter. This artificial matter, preferably a double component casting resin, can be, for instance, placed in the ring-shaped space between the receiving bore holes 5 and the holding socket 6. The surfaces that should not be moistened with the artificial resin could be covered by a corresponding separation compound. Since these double component special glues are extraordinarily strong and stable, the holding sockets can be, in this way, irremovably fastened within their corresponding receiving bore holes in a highly accurate arrangement. They maintain this location after the removal of the precision master plate and form, together with the receiving bore holes in the modulated clamping plate 2, a highly accurate instrument with a modulated network accuracy as in the present example of ±0.01 mm. This accuracy is obtained by the casting in of the precision sockets in an accurately aligned network of the modulated clamping plate 2, 2′.

In a preferred example of positioning the precision holding sockets 6 made of hardened steel, a clamping plate to be fabricated is overlaid over the precision master plate in such a way that the master plate pins penetrate in the inaccurately modulated network of the receiving bore holes 5 in the clamping plate. The outer surfaces of the pins and, in general, the whole precision master plate can be coated with the separation compound. Such separation compounds can be also suitably sprayed.

In a similar manner, the inner bore holes 7 of the socket 6 can be coated with the separation compound. In order to achieve a complete filling out of the ring-shaped space between the receiving bore hole 5 and the holding socket 6, a predetermined quantity of the double component casting resin can be deposited on the bottom of the receiving bore hole. This bottom is formed, when the clamping plate 2, 2′ is placed over the master plate, by the master plate surface and eventually by the parts of the precision holding pins for the holding sockets. After that the holding sockets 6, which are engaged with the locating pins, are forcefully pushed downwards. At this occasion the previously placed age hardening material is pressed on and penetrates from all sides into the ring-shaped space and upwards, until the matter finally appears on the upper edge, which means that the whole of the ring-shaped space has been filled out with the resin mass. The surplus of the matter can then be wiped off. The double component casting resin mass is then allowed to harden which necessitates several hours with the clamping plate 2, 2′ in position over the master plate. The double component casting resin will be preferably an epoxyde resin, known in commerce under the name of "Araldit".

After the finished hardening, there is obtained a modulated clamping plate. Its receiving openings disposed at modulated distances from each other and formed by the inner bore holes 7 through the holding sockets 6, maintain a modulated network accuracy, sufficient for all, even the extraordinarily high requests of accuracy in tool construction and in machining of the workpieces.

It will be understood that the shoulder forming surface of the modulated clamping plate is accurately machined and ground. Therefore, the dimension A shown by the sign A on the FIG. 2b, which corresponds to the modulated clamping plate 2 thickness, indicates the accuracy degree which corresponds to the accuracy degree of the modulated network, or in occurrence equal to ±0.01 mm.

From the representation on FIG. 2a or 3a can be deducted two different modifications for a similar modulated clamping plate; the rectangular modulated clamping plate 2a is particularly suitable for a highly accurate clamping and holding of workpieces which are, for example, machined on a milling machine or a drill press. The circular clamping plate shown in FIG. 3a can be utilized on turning machines adaptable to all kinds of machining, thus providing more advantages than the previously well known face plates.

The completed modulated clamping plates are then provided with solid holding or plug pins 10 (see the little drawing at the FIG. 3a). The outer dimensions of the plug pins correspond accurately to the holding socket 6 inner bore holes 7. The length of the plug pins exceeds the depth of the inner bore hole of the holding socket in such a way that the protruding ends of the plug pins 10 help to use the precision modulated network of the clamping plate 2, 2′.

To that effect, the modulated clamping system, which includes initially the shown clamping plates 2, 2′, is completed to a building box system which includes a multitude of other fastening devices, such as the stopping pins, angles or reglets, bearing devices and the like.

These supplementary components can be found in the FIGS. 4–6; each will be further discussed separately; for the fastening of these components, but ultimately for the fastening and clamping of the workpieces to be machined onto the clamping plates, the modulated clamping plates include additional bores 11 in excess of the normal numbers required for the modulated network which can be provided with inner threads and which preferably are also located within the modulated network system. These bore holes receive the bolts, their positioning inside of the modulated distance system being fundamentally arbitrary. Therefore, it is not necessary that the modulated distance system maintained for the threaded bore holes be accurately ascertained. These bore holes are there not only to permit accurate clamping on of objects, systems and workpieces with aid of the precision holding sockets and corresponding plug pins 10, but also the other components in order to create the possibility of machining under action of force or pressure, for instance, for the carrying out of the chip removing operations. Therefore, these threaded bore holes within the modulated system serve to fasten the clamping angles (to be explained later), the leading, buffering or bearing reglets, or the bearing or buffering turrets, as well as the commercially available mechanic, hydraulic or pneumatic clamped elements.

Finally, the modulated clamping plates shown in FIGS. 2a and 3a include still other bore holes or passages 13, not included within the modulated distance system, which need not be oriented in the precision scale required for the holding sockets of the modulated clamping plate. These supplementary bore holes 13 serve to fasten the clamping plate to the tooling machines. This possibility will be discussed further on with respect to the representation of the FIG. 1.

Figure 4A:
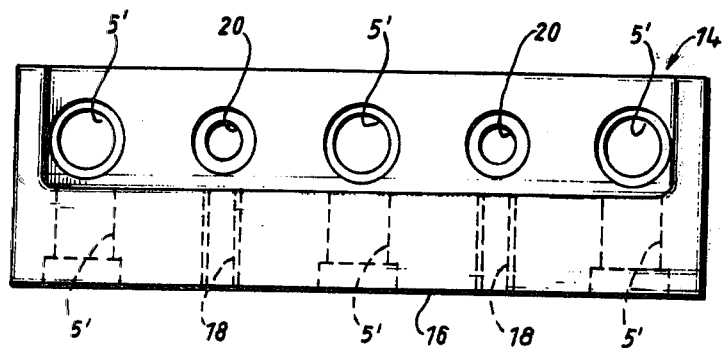
FIG. 4a is a bottom plan view of an example of a precision clamping angle for use with the modulated clamping plate as in FIGS. 2 or 3.

In order to achieve, in the broadest manner possible, a universal building box system for the clamping on and bearing of the workpieces, and to ensure that the workpieces do not come into immediate contact with the holding pins 10 located in the bore holes 7 in the precision holding sockets 6, in conformity with other characteristics of the present invention, there are provided additional auxiliary devices and systems, among which there is that shown in the FIGS. 4a–4c, a base angle, or bearing angle. The sectional representation of the FIG. 4c provides a better understanding of the construction of such a base angle 14 which is also shown in operation in FIG. 1. The base angle 14 is provided with two surfaces, namely the ground surface 15 and the back surface 16 which precisely serve as back stops and are machined and ground to precision. Besides the usual screw threads 18 for the mounting of the workpieces or other stopping elements, the representations of FIGS. 4a–4c show the receiving bore holes 5', serving for the positioning of precision holding sockets, or which at least, could serve so. More bore holes 20 serve to receive bolts and to fasten such a precision stop angle on the modulated base plate 2, 2'. The distances between the fixed precision holding sockets are within the predetermined modulated system and maintain the desired accuracy to ±0.01 mm.

The building box system for the universal use is finally completed by the so called stop turrets, one of which is shown in the FIG. 5 and indicated by the reference number 22. The distances of its surfaces 23, 24 and 25 from each other lie within of the prescribed accuracy degree of ±0.01 mm; a continuous bore hole 26 which is countersunk at both ends serves to receive a bolt. It is understood that stop turrets with arbirary distance measures could be utilized and that the lean-on shoulder faces could be determined by the arbitrary heights of these stopping or distance turrets.

Figure 6A:
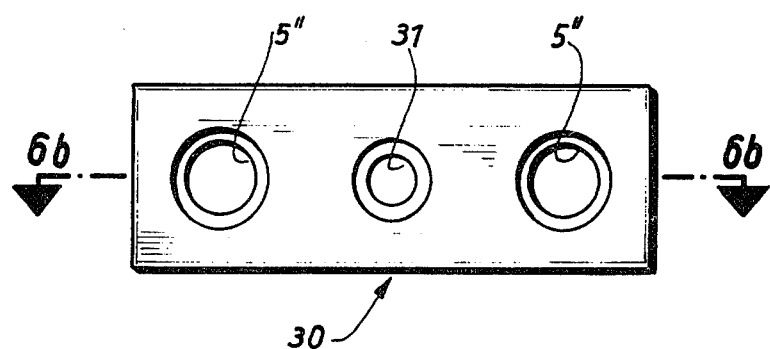
FIG. 6a is a top plan view of another example of a bearing or distance reglet with highly accurate finished surfaces.
Figure 6B:
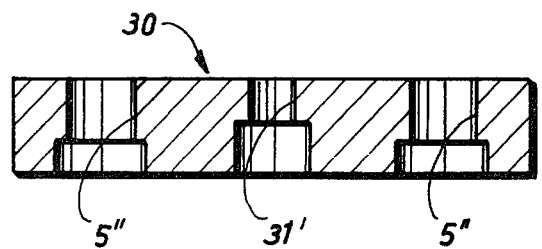

The FIGS. 6a and 6b illustrate a possible form of a distance or a lean-on reglet 30, which has, in addition to the two bore holes 5 provided with holding sockets which are spaced the required modulated network distance, a receiving bore hole 31 for a fastening bolt. Since in such stop reglets, preferably all surfaces are precision machined, and ground within a ±0.01 mm accuracy, the stop reglet 30 of FIGS. 6a and 6b is appropriate for an arbitrary choice of uses. It is understood that these additionally mentioned auxiliaries for the precision bearing and fastening purposes of objects and workpieces to the modulated clamping plates 2, 2' are given only as examples and show only a few possibilities of the multitude of those existing in a construction of a modulated building box system.

The representation in FIG. 1 illustrates a possible example of an application of the invented modulated clamping system. A milling machine 50 with a milling head designated by 51 is shown provided with sleds 40. A rectangular modulated clamping plate 2" is mounted on the sleds 40 for instance, by means of bolts or the like through the bore holes 13 to the groove blocks provided in the sled grooves. In an appropriate place in the modulated clamping plate 2", holding pins 10 are inserted and extend into the corresponding precision holding sockets in the bore holes 5' in the ground flange 15 of the stop angle 14 as shown in FIG. 4a. This stop angle is, therefore, precisely aligned and, though not shown in FIG. 1, held down by means of bolts screwed into the threaded bore holes 11 of the clamping plate 2".

The further construction, starting now from the smaller clamping system on the backside 16 of the stop angle 14, is arranged in such a way that the latter receives a further stop angle 41, so as to create a new stop surface perpendicular to the back surface 16; moreover, on the upper part of the stop angle there is fastened a stop reglet 30, separately described with reference to FIGS. 6a and 6b. A differently shaped stop reglet 30' is fastened below reglet 30 on the backside of the stop angle 14. On this reglet 30' is then constructed a lean-on turret 22, such as it has been shown on the FIG. 5. This lean-on turret 22 serves as a counterbearing for a stop reglet 43, which rests on one side in a depression 44 on the lean-on turret 22, and on the other side leans on a surface of the workpiece 45 to be machined by the milling head 51. One side of the workpiece leans against the stop reglet 30 and on an adjacent side of the workpiece on the stop reglet 41. Both of these reglets are fastened to the stop angle 14. The holding reglet 43 is fastened by means of a bolt screwed into the corresponding threaded bore hole in the back surface 16 (FIG. 4c) of the stop angle 14.

Figure 7:
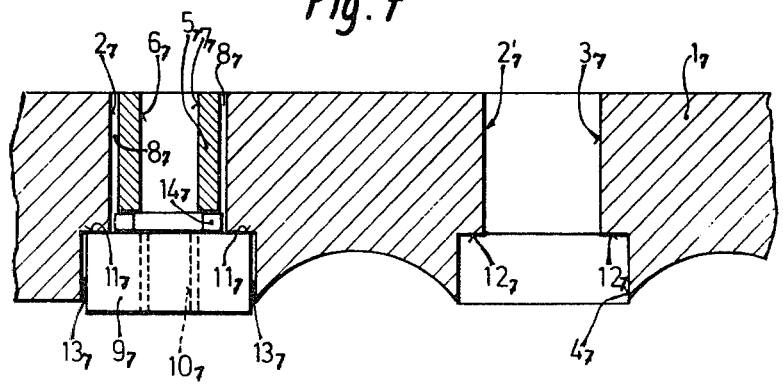
FIG. 7 is a cross section of a modulated plate illustrating a typical arrangement of a fitting bore hole part and a threaded bore hole part in a receiving bore hole.

FIG. 7 shows finally in a partial section a further advantageous shape of the modulated clamping plate with two receiving bore holes, the left side receiving hole having been already prepared. The modulated clamping plate $1_7$ includes two receiving bore holes $2_7$ and $2'_7$ in a manner corresponding to the desired modulated system at accurately coordinated distances, though with the normal tolerance.

For the fabrication of a modulated clamping system, according to the spirit of the invention, the so called precision master plate with highly accurate predetermined network distances can be utilized here. The receiving bore holes $2_7$ and $2'_7$ of the receiving plate $1_7$ are shown countersunk and comprise an upper fitting bore part $3_7$ and a lower threaded bore part $4_7$ with a bigger diameter. This bigger diameter is not absolutely necessary, but it facilitates, as it will be later explained, the assembling work. In the fitting bore part is introduced a holding fitting socket designated by $5_7$ which is at least on its inner surface $6_7$ hardened and could be made of a precision steel. If desired, the inner bore of the holding fitting socket $5_7$ could be rounded or beveled at its uppermost end $7_7$ for an easier introduction of fitting pins or fitting screws.

Between the outer walls of the holding socket $5_7$ and the inner wall of the fitting bore part $3_7$ there remains an annular space $8_7$, in such a manner that it is possible to accurately position the holding socket with aid of the master plate. It will be understood that the plate $1_7$, only partially shown on the drawing, includes in its system of coordinates a multitude of such receiving bore holes $2_7$, $2'_7$. The master plate can then be applied with its already positioned pins, or with pins inserted in its bore holes so that a pin is inserted in each inner bore hole $6_7$ of the holding socket $5_7$ and thus accurately positions the sockets $5_7$ relative to each other.

In the interspace or the ring-shaped space $8_7$ between the holding socket and the receiving bore hole will be then introduced or sprayed an adequate, non-shrunkable, casting material, for example, a double component epoxy resin. Subsequently the master plate is taken off when the precision holding sockets $5_7$ are irremovably fastened in the plate $1_7$ in their positions and the sockets thus form a network of precisely aligned openings for the fitting pieces, fitting screws etc. As it can be seen in FIG. 7, the holding sockets do not occupy all of the receiving bore holes $2_7$, $2'_7$, but only the part $3_7$ which has a smaller diameter. It is, therefore, possible to introduce in the lower bore hole part $4_7$ (with a bigger diameter) another holding socket $9_7$ including an inner threading $10_7$, and situated concentrically with the holding fitting socket $5_7$. This holding threaded socket $9_7$ is also made of the appropriate hardened steel with a correspondingly hardened inner thread, and can be, for instance, fixed in its receiving bore hole by pushing one fitting screw through the socket $5_7$ from above, and therefore, profiting of the already precisely fastened fitting socket part. The socket $9_7$ can then be screwed from below onto the threaded part of the fitting screw extending below part $3_7$ of bore $2_7$ until the outer edge portions $11_7$ of the holding threaded socket $9_7$ come to touch the shoulder $12_7$ as a result of the diameter difference between the fitting bore hole $3_7$ and the threaded bore hole $4_7$.

So as it can be seen, the holding threaded socket $9_7$ is given in this manner an accurately concentrical position with respect to the corresponding holding fitting socket $5_7$, and therefore, to the totality of the modulated clamping system.

After socket $9_7$ is accurately positioned, it is securely fastened within plate $1_7$ by means of a cast-in material introduced in the annular space $13_7$.

After hardening of the material cast in the annular space $13_7$, the fitting screw is removed by unscrewing it. There remains through the thickness of the modulated clamping plate $1_7$ a receiving bore hole with hardened inner walls comprising a fitting part and a threaded part. This bore hole is accurately located with respect to the totality of the modulated clamping system and, moreover, the hardened threaded bore $10_7$ is concentric with respect to the fitting bore hole.

Between the holding socket $5_7$ and the holding threaded socket $9_7$ can be placed a gasket $14_7$; moreover, it will be understood that the shoulder $12_7$ in the receiving bore hole $2_7$, $2'_7$ is not absolutely necessary, since it can be easily seen that the invented basic principle is also applicable when both sockets $5_7$ and $9_7$ have the same outer diameter.

The shoulder $12_7$ prevents lifting of the thread bushing by a screw which is inserted and tightened.

Alternatively, it is also possible to fix the position of the holding threaded socket $9_7$ without the aid of the permanently and accurately positioned holding socket $5_7$. In this case, the socket $9_7$ is accurately aligned with the aid of the master plate, and the socket $5_7$ is then accurately aligned with the socket $9_7$ by a fitting screw as explained above. Such a construction also employs the invention's basic principles of the disposition of two differently functioning holding sockets in a single bore hole of a modulated clamping system, as well as the relative positioning of the sockets to each other by means of placing of one of the sockets initially in a highly accurately fixed position within the modulated clamping system.

This development in conformity with the invention enables the modulated clamping system to attain a degree of accuracy of $\pm 0.005$ mm relatively inexpensively. Moreover, such a degree of accuracy was not previously believed to be possible by those skilled in the art.

One of the advantages of the modulated clamping system comprising a building box form of modulated basic clamping plates provided with other components shown in the drawing, is that positioning and fabrication of workpiece holders (as illustrated in FIG. 1) can be done rapidly and without having to use the services of the tool construction or the general construction departments.

A photograph taken of the FIG. 1 representation, for example, is sufficient without accumulation of drawings and data values to create a reliable documentation for a subsequent reconstruction application, since the necessary structural elements and the modulated network can be easily recognized on the photograph.

Furthermore, it is particularly advantageous that such workpiece holders utilizing the invented modulated clamping system can easily be taken apart by merely unscrewing bolts and removing locating pins. Thus, a new fixture can be rapidly constructed and installed. Furthermore, such a system avoids the need for costly execution drawings, material bills, fabrication or purchases of specially fabricated materials and storage of numerous special function fixtures.

It is also extremely advantageous that the cost of such a system is relatively insignificant since, especially in the case of the precision holding sockets made of the hardened steel, these parts can be often and repeatedly reused without undergoing any appreciable wear and thereby causing undesirable inaccuracy of the system. The basic costs for production of workpieces, even the noncommercialized series, prototypes, laboratory constructions, testing appliances etc. is relatively low and not comparable with the usual costs.

For example, a basic apparatus with use of the modulated clamping system can be built immediately in the production department of the manufacturer, or in the tool distribution room, which considerably reduces the machines stoppage times.

The invented modulated clamping system has many applications and can be used with milling machines, profile milling machines, shapers, planers, lathes etc., as well as testing devices and in the checking departments, since the invented modulated clamping system can furnish the most accurate distance measures which can be here used.

Another advantage is that several clamping plates can be coupled together with reglets pinned to the plate surfaces. In this manner the accurate modulated system distance measures is maintained so that even very large workpieces can be fabricated and produced with the same degree of precision. Since in a preferred example, the longitudinal sides of the modulated clamping plate are reinforced, they can receive the stop reglets, so that multiple spindle drilling or milling machines can be operated with the same degree of accuracy. It is understood that the height of the lean on reglets and turrets can be chosen in any suitable manner.

Finally, it is important to note that the precision master plate need not be permanently provided with protruding pins disposed at precise modulated distances from each other in order to engage and align the holding sockets of the corresponding modulated clamping plates. It is alternatively possible to provide the precision master plate with bore holes precisely spaced at the required network distances, into which removable pins identical to those already mentioned can be inserted for the accurate alignment of the precision holding sockets.

It is also possible to fabricate the separate components and the modulated clamping plates from a different material than metal, for instance, cast iron or marble. For the electrical product constructions, a system could be made of glass, technical silicates, acrylic glass or another transparent material.

It is apparent that although I have described several embodiments of the present invention other modifications can be made without departing from the spirit of the invention as expressed by the appended claims.

I claim:

1. A method for the fabrication of an apparatus for the true fitting and highly accurate bearing and detachable fastening of various workpieces to be machined comprising:
   (a) boring a plurality of holes in a plate, said holes being arranged in a predetermined coordinate pattern at a predetermined modular distance from each other within a normal (0.3 mm) tolerance of accuracy to form a modular clamping plate;
   (b) placing precision holding sockets of a smaller diameter than that of the bore holes into the bore holes which results in appearance of an annular interspace;
   (c) aligning the placed precision holding sockets with aid of a high precision master plate having a plurality of socket engaging means arranged precisely in said predetermined coordinate pattern so that said means are at said predetermined modular distance from each other within a highly precise tolerance of accuracy; and
   (d) applying an age hardening material into the annular interspace; and
   (e) separating the modular clamping plate from the master plate after the age hardening material has hardened;
wherein said boring step further comprises:
   drilling a first bore part, and second bore part, and
wherein said placing step comprises inserting in the first bore part the holding fitting sockets with creation of an interspace, and
wherein after said separating step, the method further comprises:
   placing a threaded holding socket featuring an inner thread in the second bore hole part, positioning it with respect to the fixed position of the holding fitting socket, and
   in the interspace between the holding threaded socket and the second bore hole part applying the age hardening material.

2. The method in accordance with claim 1, wherein the holding threaded socket is concentrically aligned with respect to the holding fitting socket by a series of steps comprising sliding a fitting screw into the holding socket leaving a threaded end exposed and screwing a threaded holding socket onto the threaded exposed end of the fitting screw.

3. A method for the fabrication of an apparatus for the true fitting and highly accurate bearing and fastening of workpieces to be machined comprising:
   (a) boring holes in a plate at a predetermined modular distance from each other within a normal (0.3 mm) tolerance of accuracy;
   (b) placing precision holding sockets of a smaller diameter than that of the bore holes into the bore holes which results in appearance of an annular interspace;
   (c) aligning the placed precision holding sockets with aid of a high precision master plate; and
   (d) applying an age hardening material into the annular interspace; and
   (e) separating the modular clamping plate from the master plate after the age hardening material has hardened; and
wherein said drilling step further comprises:
   drilling a first fitting bore part, and a second bore part, and that in the first fitting bore part are introduced the holding fitting sockets with creation of an interspace, and
wherein after said separating step, the method further comprises:
   placing a threaded holding socket featuring an inner thread in the second bore hole part, positioning it with respect to the fixed position of the holding fitting socket
and
   in the interspace between the threaded holding socket and the second bore hole applying the age hardening material;
and
   wherein the threaded holding socket is concentrically aligned with respect to the holding fitting socket by a series of steps comprising sliding a fitting screw into the holding socket, leaving a threaded end exposed and screwing a threaded holding socket onto the threaded exposed end of the fitting screw.

* * * * *

UNITED STATES PATENT AND TRADEMARK OFFICE
CERTIFICATE OF CORRECTION

PATENT NO. : 4,310,963
DATED : January 19, 1982
INVENTOR(S) : Rudi Blumble

It is certified that error appears in the above—identified patent and that said Letters Patent is hereby corrected as shown below:

Column 7, line 58, delete "arbirary", insert --arbitrary--.

*Signed and Sealed this*

*Twentieth* Day of *April 1982*

|SEAL|

*Attest:*

GERALD J. MOSSINGHOFF

*Attesting Officer*     *Commissioner of Patents and Trademarks*